(12) United States Patent
Fried et al.

(10) Patent No.: US 8,583,498 B2
(45) Date of Patent: Nov. 12, 2013

(54) SYSTEM AND METHOD FOR BIOMETRICS-BASED FRAUD PREVENTION

(75) Inventors: Lance Fried, Aventura, FL (US); Joseph Katz, Atlanta, GA (US); Rick Korfin, San Diego, CA (US)

(73) Assignee: Face It Corp., San Diego, CA (US)

( * ) Notice: Subject to any disclaimer, the term of this patent is extended or adjusted under 35 U.S.C. 154(b) by 0 days.

(21) Appl. No.: 13/340,291

(22) Filed: Dec. 29, 2011

(65) Prior Publication Data

US 2012/0330765 A1   Dec. 27, 2012

Related U.S. Application Data

(60) Provisional application No. 61/428,794, filed on Dec. 30, 2010.

(51) Int. Cl.
*G06Q 20/40* (2012.01)

(52) U.S. Cl.
USPC ............... 705/18; 705/17; 705/39; 705/44; 235/380; 340/5.82

(58) Field of Classification Search
USPC ............ 705/18, 17, 16, 39, 43, 35, 67, 50; 340/5.82; 235/379
See application file for complete search history.

(56) References Cited

U.S. PATENT DOCUMENTS

| | | | |
|---|---|---|---|
| 5,127,043 A | 6/1992 | Hunt et al. | |
| 5,655,007 A | 8/1997 | McAllister | |
| 5,870,723 A | 2/1999 | Pare et al. | |
| 6,516,056 B1 | 2/2003 | Justice et al. | |
| 6,824,049 B2 * | 11/2004 | Lee et al. | 235/380 |
| 6,850,901 B1 | 2/2005 | Hunter et al. | |
| 7,103,576 B2 | 9/2006 | Mann, III | |
| 7,386,101 B2 | 6/2008 | Pugliese | |
| 7,802,723 B2 | 9/2010 | Petrone et al. | |
| 8,336,766 B1 * | 12/2012 | Miller et al. | 235/379 |
| 2002/0035539 A1 | 3/2002 | O'Connell | |
| 2007/0005511 A1 * | 1/2007 | Martinez | 705/67 |
| 2007/0174615 A1 * | 7/2007 | Ballou et al. | 713/168 |
| 2008/0040265 A1 * | 2/2008 | Rackley, III et al. | 705/40 |
| 2008/0126145 A1 * | 5/2008 | Rackley, III et al. | 705/7 |
| 2009/0322477 A1 * | 12/2009 | Celorio | 340/5.82 |
| 2010/0257098 A1 | 10/2010 | Mann, III et al. | |
| 2010/0325442 A1 | 12/2010 | Petrone et al. | |
| 2011/0238510 A1 * | 9/2011 | Rowen et al. | 705/16 |

\* cited by examiner

*Primary Examiner* — Vanel Frenel

(74) *Attorney, Agent, or Firm* — Stetina Brunda Garred & Brucker

(57) ABSTRACT

The system employs the use of biometric authentication, a fraud control gateway and widget, and a point of sale sensor to restrict the use of credit cards or other financial tokens to authenticated actual owners of the card or token. The card or token holder will have biometric information entered into a database during an initiation or enrollment process, and subsequent uses of the card may be authenticated by comparing the biometric information of the attempted user to biometric information stored in the system. The biometric component is used for voice authentication. As part of a multi-factor security schema, the biometric authentication is combined with a series of point of sale and fraud control methods to ensure a comprehensive security umbrella for financial transactions. Both financial institution limits to transactions and consumer-preferred limits to transactions are employed.

24 Claims, 5 Drawing Sheets

SYSTEM AND METHOD FOR BIOMETRICS-BASED FRAUD PREVENTION

CROSS-REFERENCE TO RELATED APPLICATIONS

This application relates to and claims the benefit of U.S. Provisional Application No. 61/428,794 filed Dec. 30, 2010 and entitled SYSTEM AND METHOD FOR USING BIOMETRICS FOR CREDIT CARD FRAUD PROTECTION, which is wholly incorporated by reference herein.

STATEMENT RE: FEDERALLY SPONSORED RESEARCH/DEVELOPMENT

Not Applicable

BACKGROUND

1. Technical Field

The present disclosure relates generally to electronic transaction processing and management, and more particularly, to systems and methods for biometrics-based fraud prevention with customer contact center interactions, credit card transactions and other financial transactions involving customer-driven preferred alerts, thresholds, and limits.

2. Related Art

Credit cards are a popular payment method, and the average number of transactions per user is increasing year by year. Many of these transactions are no longer in person or point of sale transactions, but are transactions that take place over the phone or online. Many users sense an increased risk for these remote transactions and often decline to participate in the modern economy as a result. Even customers who do participate in remote transactions have a heightened anxiety about the security of their identity and credit card information. People rightfully are concerned about identity theft, credit card theft and fraud, and other misuses of private and personal financial data and information.

There are a number of security checks that can prevent fraudulent transactions, but many of these aid the vendor more than the consumer. Oftentimes merchant agreements with credit card issuers pass the liability for fraud on to the merchant, and proper crediting for losses may require extensive investigation and documentation. Under existing law, the consumer is rarely, if ever, liable. As such, it is perhaps not unexpected that much fraud prevention efforts have focused largely on the vendor side.

One technique is to require the user to provide the security code that is printed on their credit card. This is often a four digit number that is separate from the credit card account number. This allows the vendor to at least feel confident that the person has the physical card in their hands, but it does not aid the consumer because anyone who has the physical card can initiate and complete transactions.

Another security measure is the use of complex algorithms that create patterns for each consumer. When card activity appears outside of the typical use pattern for a consumer, the credit card company will often contact the cardholder to validate a recent transaction, or to inquire if their card might be lost or stolen.

To offer some degree of comfort for the consumer, but also to add a level of protection against fraud to the credit card issuer and to the merchant, various consumer-side user experience enhancements have been contemplated. Although not implemented by most credit card issuers, these enhancements include the ability for the consumer to set thresholds and preferences that will trigger alerts and fraud remediation. For example, consumers can indicate the upper limits of spending on a credit card or other financial token so an alert will trigger further verification means if that threshold is reached. These techniques provide some level of protection to the merchant and the credit card company, but they do not provide additional protection for the consumer. Accordingly, there is a need in the art for systems and methods for biometrics-based fraud prevention

BRIEF SUMMARY

The present disclosure is directed to a financial transaction fraud prevention system that may include a collection of intelligent software and input/output devices which, in concert, provide multi-factor authentication and security for financial transactions. In one aspect, a security application service is used to manipulate inbound and outbound phone calls which connect to consumers' smart phones or regular phones. This security application service also controls biometric engines and a biometric token database.

In another aspect of the invention, a customer service agent desktop is connected to the system via telephony and data communications links and special fraud control software. Such fraud control software is used to alert customer service agents of suspected fraud-based activity and other data having to do with an attempted financial transaction. A point of sale gateway and sensor is used to convert standard web, P.O.S. or ACH type transactions into standard data/transaction streams for interpretation by a fraud decisioning engine, which is likewise connected to the aforementioned application server. Consumers may interact with the system either by IVR (Interactive Voice Response) or Smartphone or computer, in order to set pre-defined thresholds for financial transactions, location, frequency of use, and a variety of other attributes—in order to set triggers for fraud or unauthorized use based on the preferences of the consumer. The combination of the biometric validation, fraud control software, consumer-driven fraud threshold preferences, and point of sale gateway and sensor provide for a comprehensive security schema for financial transactions.

The security application service provides voice biometric identification for card user verification during the card swipe process. The biometric authentication may not always be used. In one embodiment, the system is triggered by one or more factors that may be present in, or prior to, a transaction. These factors can include triggering by current fraud detection techniques at the card processor, preset spending limits, and other triggers.

When the credit card processor or financial token processor fraud detection algorithm detects an out of pattern purchase or use profile, the card processor can call the user and use the biometric voice authentication to satisfy themselves that the user is authentic. These algorithms are also based on pre-set thresholds and attributes established by the consumer. Further, the card issuer can then query the cardholder to determine if the user is at the current point of sale or if recent activity is legitimate. These detection algorithms may be stored in security application service, or they can be conveyed to the same over a data communications facility in real time or part of a batch upload process.

The biometric authentication may be achieved via the use of outbound telephone calls where a phone call is made to the telephone number of the card user and voice prompts are used to navigate the user through the process of voice authentication. Alternatively, an application running on a Smartphone, a computer, or within a web browser could be used to record a voice sample of the purchaser and that sample transmitted over a data network to a processing center for comparison with the stored users profile.

The card issuer or the cardholder can set spending limits, frequency or use limits, location limits, and other attributes (on a per transaction basis and/or a cumulative basis), and if those limits are exceeded, biometric authentication is required to allow purchases outside of those pre-set consumer-preferred limits.

Other triggers for biometric authorization during online transactions are envisioned. The cardholder can set purchase limits that do not require biometric verification. If a transaction is a pre-set limit, the system will automatically call the customer for biometric authorization. The system can be integrated into the website shopping cart process without requiring any additional infrastructure change on the part of the website. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiments of a system and method for biometrics-based fraud prevention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
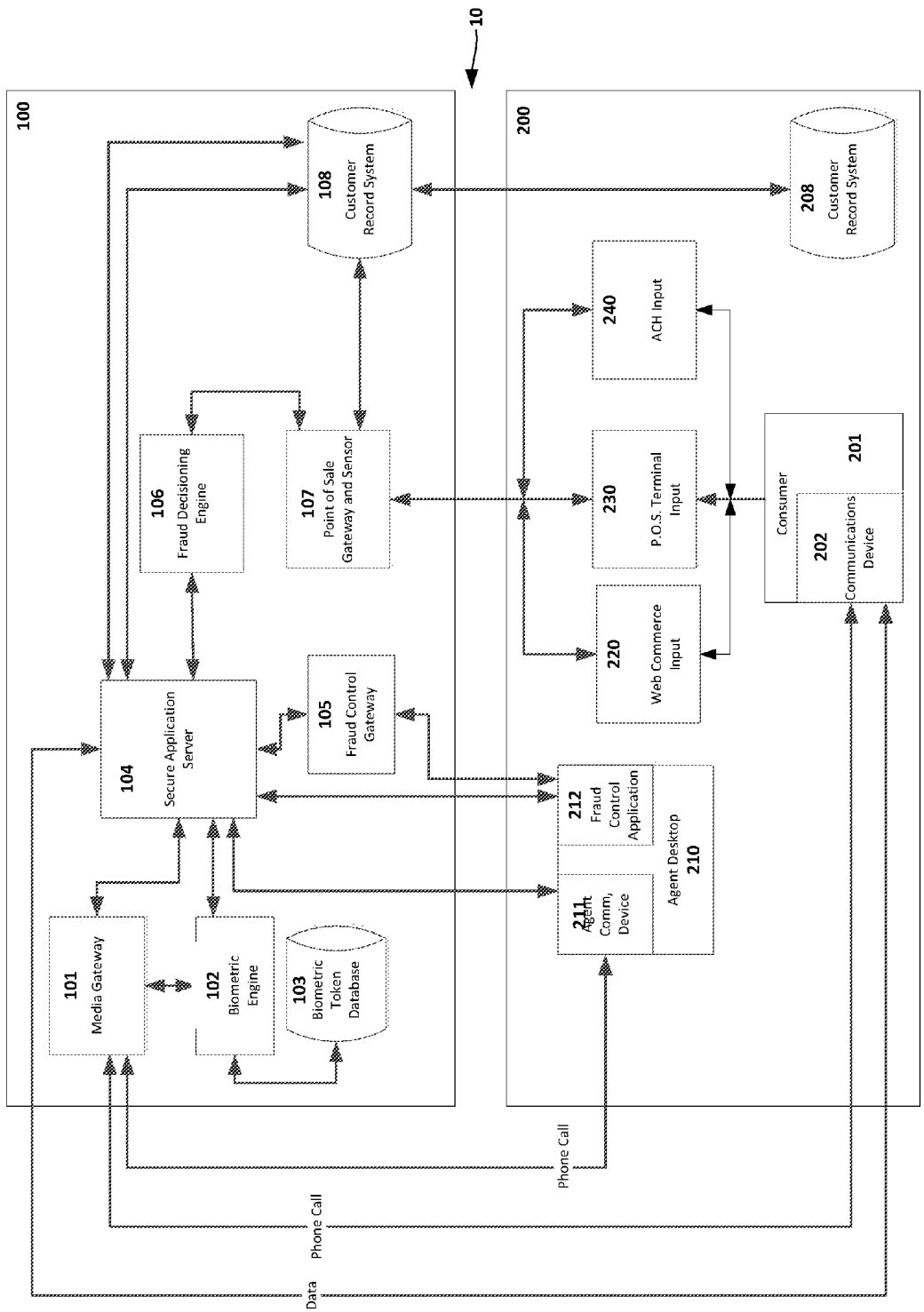
FIG. 1 is a block diagram of a financial transaction fraud prevention system in accordance with one embodiment of the present disclosure including a remote security application service and an enterprise/consumer domain.

FIG. 1 depicts a financial transaction fraud prevention system 10 for using biometrics for credit card and other financial transaction fraud protection along with multi-factor authorization facets. There is a network-based security application service 100 that is comprised of a media gateway 101, a biometric engine 102, biometric token database 103, an application server 104, a fraud control gateway 105, a fraud decisioning engine 106, a point of sale gateway and sensor 107, and a customer record system 108. In a preferred embodiment of the invention, the security application service 100 is a hosted SaaS (Software as a Service) system, but may in fact manifest in a behind-the-firewall customer premises model, or a hybrid of the two.

Also depicted in FIG. 1 is the enterprise and consumer domain 200, the elements of which interact with the security application service 100. The enterprise and consumer domain 200 is comprised of an agent desktop 210 further comprised of an agent communications device 211 and fraud control application 212, consumer communications device 202, a consumer web commerce input 220, a consumer POS (Point of Sale) terminal input 230, and an ACH (Automated Clearing House) input 240, and a customer record system 208, or replication or access to an alternate customer record system or duplicate customer record system.

The media gateway 101 serves the purpose of telephony functions and IVR (Interactive Voice Response) functions. This includes the ability to process inbound and outbound telephone calls, bridging of calls, playing of prompts, recording consumer speech, collecting spoken or touch-tone commands, and comparing biometric tokens and captured speech with the aid of the biometric engine 102, including the enrollment of users in the biometric database. Such an apparatus is commonly available in piece parts such as media gateway cards supplied by Sangoma Corporation or Dialogic Corporation, and software available in the open domain such as FreeSwitch, or software from companies such as Genesys or Cisco. Those having ordinary skill in the art will be familiar with these tools which are readily available in the open marketplace.

The media gateway 101, under the command of the secure application server 104, is also employed to present IVR (Interactive Voice Response) menus and selections that allow consumers to create stored templates that are sent to the customer record system 108. These stored templates allow the consumer to set pre-defined limits for each credit card or financial token. Such limits may include, but are not limited to dollar amounts for each use, frequency and locations. These templates may be solicited during biometric enrollment or at any time by calling a pre-assigned telephone number. Changes to the templates are also governed by biometric authentication.

The biometric engine 102 analyzes spoken words from the consumer and compares those words to a pre-captured set of phrases and words already stored in the biometric token database 103. Biometric verification software to accomplish this function is commonly available from vendors such as Nuance Communications and VoiceVault. Those having ordinary skill in the art will be familiar with standard protocols and methods such as MRCP to connect the biometric engine 102 and the biometric token database 103 to the media gateway 101.

The secure application server 104 is the communication and control hub of the security application service 100. The secure application server 104 has individual connections the other elements of the security application service 100 over a common communications facility such as TCP/IP or other common data communications method. The secure application server 104 serves as the state controller, application controller, decisioning controller, database access mechanism and gateway controller. The application server 104 is may be a RESTlet (Representational State Transfer) Java framework, though this is by way of example only and not of limitation. It will be recognized that REST is a fundamental model for simple HTTP communications. Other available client/server or command/control protocols and models can be used, although the preferred embodiment of the invention utilizes a REST-based architecture.

The fraud control gateway 105 is used to connect directly to the fraud control application 212 or equivalent desktop software such as a CRM (Customer Relationship Management) system. In a preferred embodiment of the invention, the fraud control application 212 can be created using commonly available tools for presence management (SMPP) and chat communication (IM/Chat) using open source software. One implementation utilizes a widget on the desktop so that the security application service 100 can easily connect to agents over HTTP and further, no integration at the desktop is necessary. Information about the caller's biometric verification can be sent to the widget and the widget can broadcast agent availability (presence) using common protocols so no deep integration with CRM or CTI (Computer Telephone Integration) systems is required. In an alternate embodiment of the invention, the fraud control gateway 105 can connect directly to a CRM system at the agent desktop 210.

Such a CRM system is commonly available from companies such as Oracle or Salesforce.com. It will be appreciated that various APIs (Application Programming Interfaces) are available for communicating with these CRM systems and databases.

The purpose of the fraud decisioning engine 106 is to: a) manage multiple point of sale transactions; b) categorize security threats based on pre-defined rules; c) manage multiple phone or SmartPhone-based transactions' attributes based on data received from the secure application server 104; and d) pass suggested workflow actions to the Secure application server 104.

The decisioning and policy management capabilities of the fraud decisioning engine 106 can be created using off-the-shelf tools available for BPM (Business Process Management). These tools are available as open source such as the DROOLS Decisioning system supported by JBOSS, or the Oracle RTD (Real Time Decisioning) system. In a preferred embodiment of the invention, the fraud decisioning engine 106 is a stand-alone process associated with the security application service 100 and co-located with the other elements thereof. In an alternate embodiment of the invention, the fraud decisioning engine 106 itself can be hosted elsewhere or part of a separate service which may integrate with the other components of the security application service 100.

In another embodiment of the fraud decisioning engine 106, the engine can be provided by the card issuer or it can be part of the system as desired by the participants. If there is anything at the fraud decisioning engine 106 that would trigger the need for biometric authorization, either a potential fraud detection or a customer initiated trigger (e.g. purchase amount) then the transaction information is routed to the secure application server 104.

As briefly indicated above, the security application service 100 includes the point of sale gateway and sensor 107. One aspect thereof is to aggregate multiple data sources from web commerce input 220, the POS terminal input 230, and the ACH input 240. Another aspect is understood to be the function of normalizing the data it collects into a single stream of data to be sent to the fraud decisioning engine 106. These functions will be familiar to those having ordinary skill in the art and common tools and protocols for data transmission and in-line memory management are commonly available.

Another aspect of the point of sale gateway and sensor 107 is its ability to communicate with the customer record system 108. In a preferred embodiment of the security application service 100, the customer record system 108 is encapsulated in a commercial-grade database such as Oracle or Microsoft SQL server, which may be co-located with the other elements of the security application service 100 or distributed. In another embodiment of the invention, the customer record system 108 may be located elsewhere, such as inside the enterprise and consumer domain 200, as depicted in FIG. 1. It will be recognized that remote databases may be accessed variously by direct SQL query, JDBC, web services, or access to database elements by proxy, as in an interface to a CRM system.

Considering now the various components of the enterprise and consumer domain 200, the agent desktop 210 is comprised of an agent communications device 211 and the fraud control application 212. In addition to the aforementioned functions, the fraud control application 212 may also have software to provide phone control capability. There are several protocols and software for TAPI (Telephony API) and CTI (Computer Telephone Integration) interfaces to allow for third party call control of an agent's desktop phone. In a preferred embodiment of the invention, the agent communications device 211 is a commonly available instrument such as a telephone typically connected to a commercially available PBX (Private Branch Exchange) or ACD (Automatic Call Distributor). In this case there is typically an extension number or direct line associated with each phone. In a preferred embodiment of the invention, the agent's phone number is stored in the secure application server 104 and loaded into the fraud control gateway 105, and further communicated to the associated fraud control application 212. Here, the secure application server 104 can contain a routing program that associates each agent communications device 211 with each fraud control application 212 to facilitate routing to the correctly available agent when a telephone connection is required for a consumer transaction.

Likewise, there is a telephone, mobile telephone, or other communications device associated with the consumer who wants to initiate a financial transaction. The consumer communications device 202 is connected to the agent communications device 211 via the media gateway 101 after biometric authentication and other validation steps are taken.

In a preferred embodiment of the invention, this consumer communications device 202 may in itself act as a "possession" in the hands of a user who is yet to be validated. The phone number associated with the consumer communications device 202 can be stored in the customer record system 108 and used as a callback phone number to initiate a biometric validation with the consumer. The fact that the consumer can only be called on a device owned by that individual adds another authentication aspect. In an alternate embodiment of the invention, the consumer communications device 202 could be replaced by a TV Set-Top box and/or remote, or an in-car telemetry system. In both examples, the set-top box and the automobile itself act as points in a multi-factor authentication schema.

In a preferred embodiment of the invention, the consumer communications device 202 has an application associated therewith that will allow the phone itself to act as the web commerce input 220 based on the common ability for some devices to have a separate or hybrid data communications ability in addition to phone call ability. In this particular instance, the phone itself will communicate directly with (or by proxy with other elements in the security application service 100) the point of sale gateway and sensor 107.

In a preferred embodiment of the invention, the consumer communications device 202 has an application associated therewith that will allow the phone itself to communicate with the secure application server 104, to allow consumers to create stored templates that are sent to the customer record system 108. These stored templates allow the consumer to set pre-defined limits for each credit card or financial token. Such limits may include, but are not limited to dollar amounts for each use, frequency and locations. These templates may be solicited during biometric enrollment or at any time by calling a pre-assigned telephone number. Changes to the templates are also governed by biometric authentication.

The consumer may initiate financial transactions with a system that provides the web commerce input 220, the POS terminal input 230, or the ACH input 240. Various standard protocols and methods employed by credit card transaction companies are utilized to convey credit card and ordering information over the web. These same methods are now commonly available on smartphones, thus permitting the consumer communications device 202 to communicate with the point of sale gateway and sensor 107.

In another aspect of the invention, the POS terminal input 230 may be employed by the consumer to swipe a card, RFID scan or other transactional "read" of the credit card or other financial token. As with the web commerce input 220 method, the essential data containing the credit information and personal information and credentials are conveyed to the point of sale gateway and sensor 107. The POS terminal input 230 may be employed for recurring debits to the credit card debits on a recurring schedule, such as common "autopay" scenarios. It will be recognized that the security application service 100 can therefore also be used to validate (biometrically) that it is permissible for the consumer to be billed when an "autopay" transaction is set up.

In another aspect of the invention, the ACH input 240 may be employed by the consumer to perform a card swipe, RFID scan or other transactional "read" of his credit card or other financial token. Likewise, this ACH input 240 may be employed for recurring debits to the credit card debits on a recurring schedule, such as common "autopay" scenarios. Likewise, automated transactions may trigger the use of biometrics to validate that the consumer is ready to accept that charge.

Figure 2:
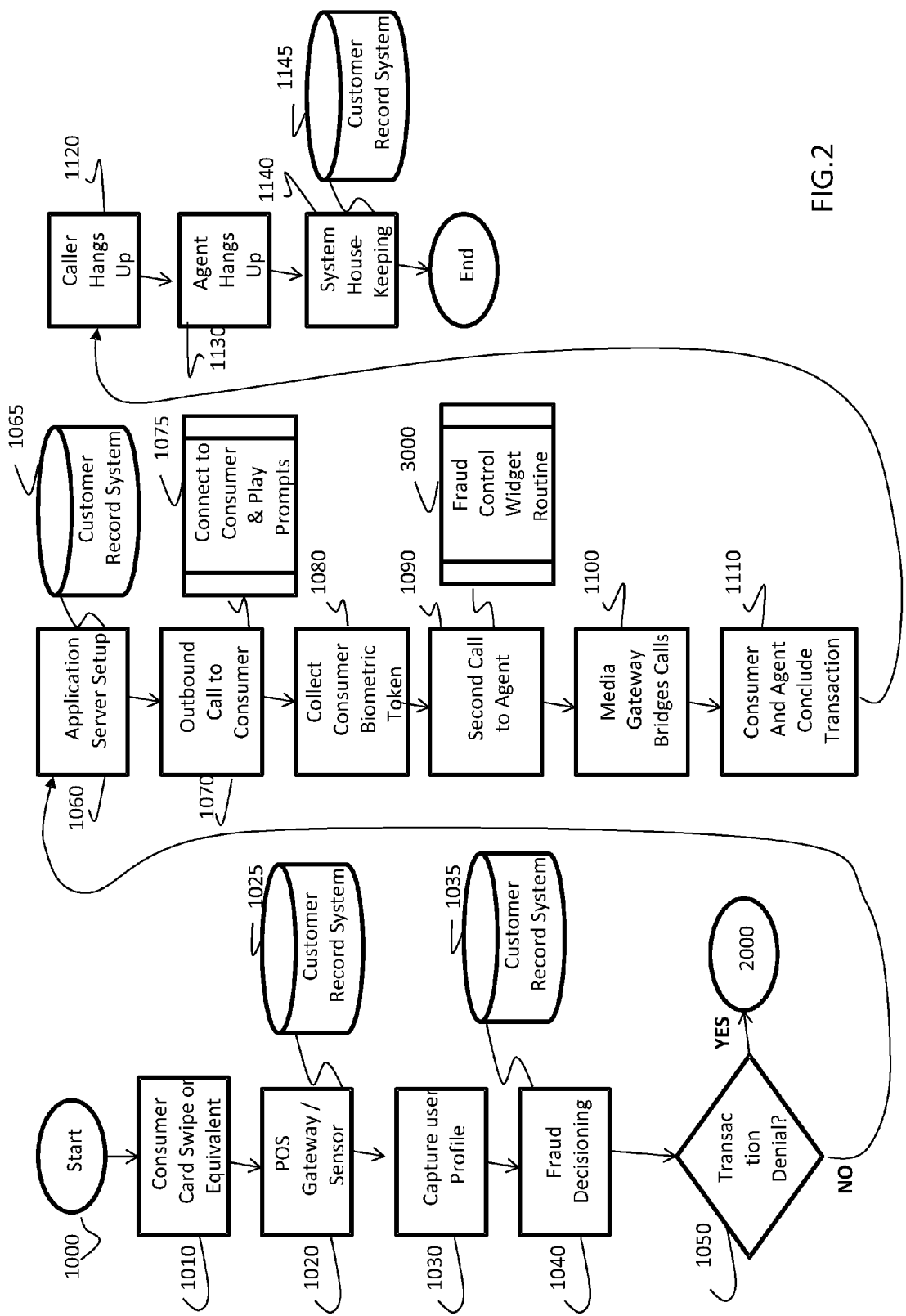
FIG. 2 is a flow diagram illustrating a point-of-sale terminal initiated transaction as handled by the financial transaction fraud prevention system.

FIG. 2 is a logic flow chart illustrating one exemplary point-of-sale terminal initiated transaction that is carried out by the above-described financial transaction fraud prevention system 10. At step 1000, the transaction process starts. Then, at step 1010, the consumer initiates a financial transaction by swiping a credit card, entering credit card digits and other credentials into a terminal or web site, or by using a fob or key mechanism. At step 1020, credit card data, transaction request data and other consumer credentials are transmitted to the point of sale gateway and sensor 107. Step 1025 involves sending a query to the customer record system 108 by the point of sale gateway and sensor 107 in order to retrieve and match consumer data at step 1030.

Thereafter, at step 1040, the point of sale gateway and sensor 107 sends transactional data and consumer profile data to the fraud decisioning engine 106, which uses its stored algorithms, fraud profiling data, and stored templates and policies to make a decision on whether or not the transaction is suspected of being fraudulent. At step 1050, the fraud decisioning engine 106 will recommend a promotion of the transaction to the next step or a denial based on the aforementioned data. If the fraud decisioning engine 106 suspects a fraudulent transaction, the transaction is initially denied which triggers step 2000. If the transaction is allowed to continue, the secure application server 104 initiates its biometric verification routine at step 1060.

At step 1065, the secure application server 104 queries the customer record system 108 for consumer data including pre-set consumer-imposed financial limits, and preferred alert thresholds. These are compared to other algorithms and alert thresholds set by the credit card or financial token provider, whereupon the fraud decisioning engine 106 will send commands to the secure application server 104. This triggers an outbound call to the consumer at step 1070 based on commands sent from the secure application server 104. In another aspect of the invention, this step 1070 may alternately employ a data channel between the secure application server 104 and the consumer communications device 202, where the status of the attempted financial transaction is displayed to the consumer on the communications device 202. This scenario is not limited to SmartPhones can may also apply to a regular computer or tablet PC.

At step 1075, the secure application server 104 commands the media gateway 101 to prompt the caller for credentials which may be entered via speech or touch tone Likewise, the media gateway, in concert with the biometric engine 102, will analyze spoken input from the consumer to match and validate biometric information at step 1080. Alternatively, biometric capture can be performed at the communications device 202 and conveyed digitally to the media gateway 101 instead of over the telephone network. Depending on the way the system is deployed the consumer himself may be able to validate the financial transaction on his own and end the use of the system for that transaction. Otherwise, the process continues at step 1090.

A call to a customer service agent is initiated form the media gateway 101 at step 1090. Now the fraud control application routine commences as described in the method beginning at step 3000 below. At step 1100, the media gateway 101 bridges the consumer telephone call and the agent telephone call together so they may speak. The consumer and the agent conclude their dialog and resulting transaction at step 1110, where the agent may initiate separate post-call routines depending on the workflow rules at that particular contact center. The consumer hangs up or otherwise terminates the session at step 1120, and likewise at step 1130 the Agent also hangs up to end the transaction. All of the elements of the system perform standard housekeeping and clean-up tasks at step 1140, and the resulting data from the transaction are stored in the customer record system 108 at step 1145. Thus ends a typical transaction in the employ of the security application service 100 for a point-of-sale initiated transaction.

Figure 3:
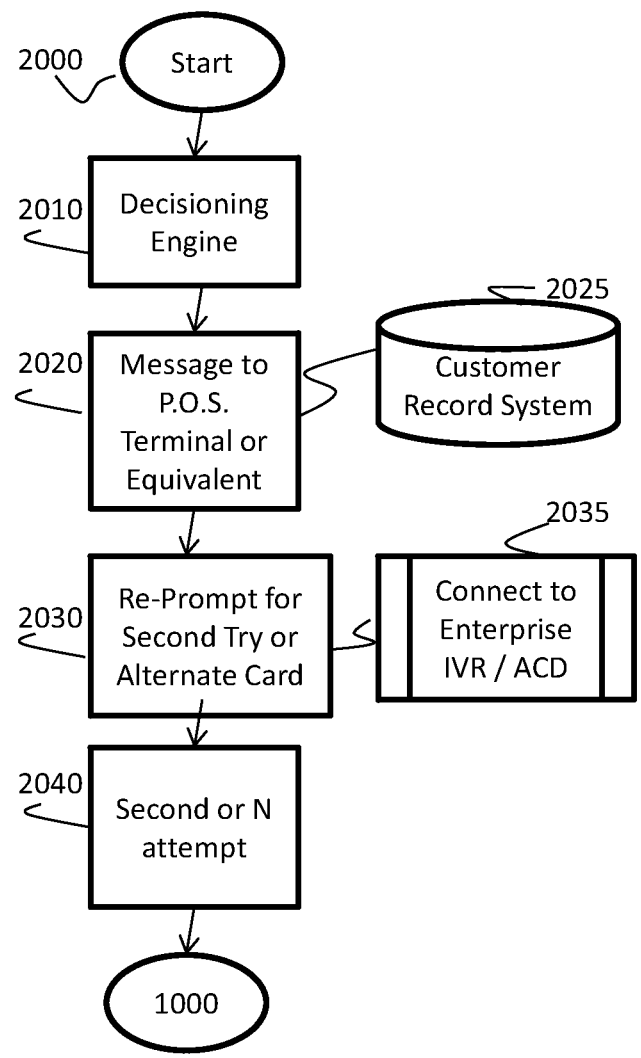
FIG. 3 is a flow diagram illustrating an exemplary transaction denial routine as executed by the financial transaction fraud prevention system.

FIG. 3 depict a transaction denial routine which begins at step 2000. At step 2010, the fraud decisioning engine 106 reacts to pre-stored algorithms established by the issuing credit card company or financial token provider. In addition, the fraud decisioning engine 106 reacts to pre-stored templates created by the consumer based on consumer preferences for spending limits, frequency of use, or other attributes preferred by the consumer. Such templates and pre-stored attributes are pre-loaded into the fraud decisioning engine 106 from the customer record system 108 at step 2025.

At step 2020, the fraud decisioning engine 106 will send messages meant for the consumer to the point of sale gateway and sensor 107. The point of sale gateway and sensor 107 will use the appropriate protocol and communication mechanism to further communicate the message to the device associated with the web commerce input 220, the POS terminal input 230 or the ACH input 240 accordingly. In an alternate embodiment of the invention, the fraud decisioning engine 106 will employ the use of the secure application server 104 to communicate the same message directly to the communications device 202, the fraud control application 212 or by verbal prompts with an outbound phone call set up by the media gateway 101.

At step 2030, the consumer (or by proxy a customer service agent), is prompted to take action on a denied financial request. Such prompting, depending on the templates and thresholds already defined, may take the form of a request to re-try the transaction, or to use an alternate card or financial token, or to further verify the identity of the person financially responsible. The consumer is connected to a customer service call center via a regular IVR (Interactive Voice Response) system or ACD (Automatic Call Distributor) a step 2035. This step represents the ability to query the consumer for more authentication tokens, connect to a live agent, or other remediation steps which may be automated or semi-automated. At step 2040, the second attempt is then tried whereupon the process re-starts at step 1000. Thus ends a typical transaction denial routine in the employ of the Security application service 100 for a point-of-sale initiated transaction.

Figure 4:
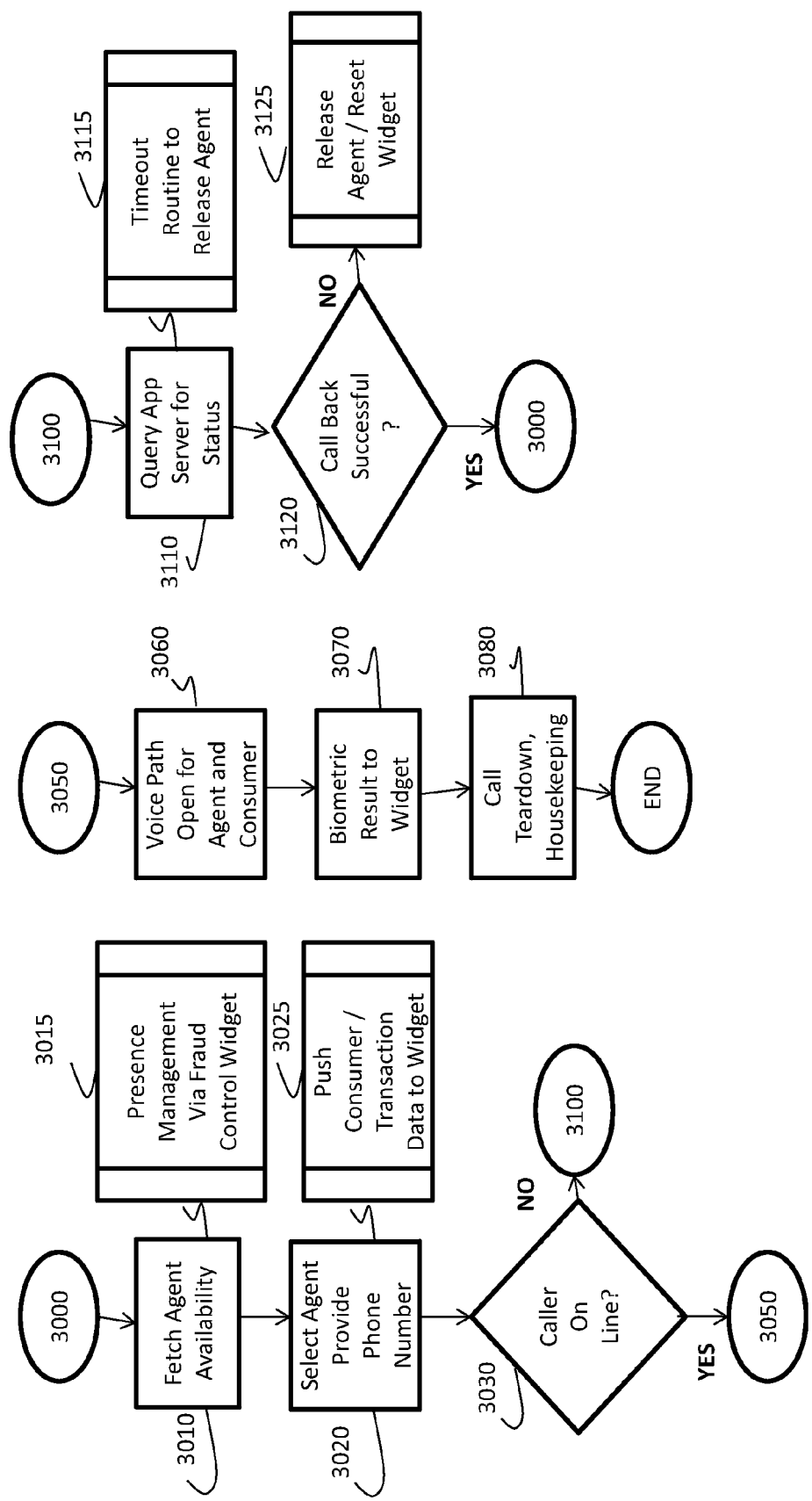
FIG. 4 is a flow diagram illustrating an exemplary fraud control widget routine.

FIG. 4 depicts the fraud control application routine commencing at step 3000. The secure application server 104 queries the fraud control application of each appropriate agent to ascertain agent availability at step 3010. This may use, but is not limited to common protocols for presence such as SMPP as shown in step 3015. At step 3020, the secure application server 104 will query the customer record system 108 for the phone numbers and other attributes associated with the available agents. The security application service 100 will then make an outbound call to the selected agent.

The security application service 100 will push the requisite information to the fraud control application 212 in order to prepare the agent for the pending transaction with the consumer at step 3025. Such information may include, but is not limited to the results of the fraud decisioning engine alerts, including card issuer algorithm alerts and pre-set triggers preferred by the consumer. The media gateway 101 will determine whether or not the consumer is active on the phone line in step 3030. If the consumer is on the line, the process continues at step 3050. If the caller is not on the line, the process continues at 3100.

In the former case, at step 3050, the media gateway 101 will open a voice path between the agent and the consumer so they are able to speak at the appropriate time. Thereafter, in step 3070, the secure application server 104 will convey the results of the biometric verification to the agent via the fraud control application 212. At step 3080, the system enters into a standard call teardown and housekeeping routine after the transaction has terminated. Then, the routine for determining how long to wait and what action to take if the consumer is not on the line commences at step 3100. The secure application server 104 continues to query the media gateway 101 for line status at step 3030. A pre-determined timeout threshold stored in the customer record system 108 is used to determine the correct thresholds for releasing the current agent and trying for a new agent accordingly.

At step 3120, the system determines whether a callback attempt to the consumer is successful. If the callback attempt is successful, the process continues at step 3000. If the callback is not successful, the agent is released to work on other issues and the fraud control application 212 is reset for the proper agent availability. Thus ends a typical fraud control widget routine in the employ of the Security application service 100 for a point-of-sale initiated transaction.

Figure 5:
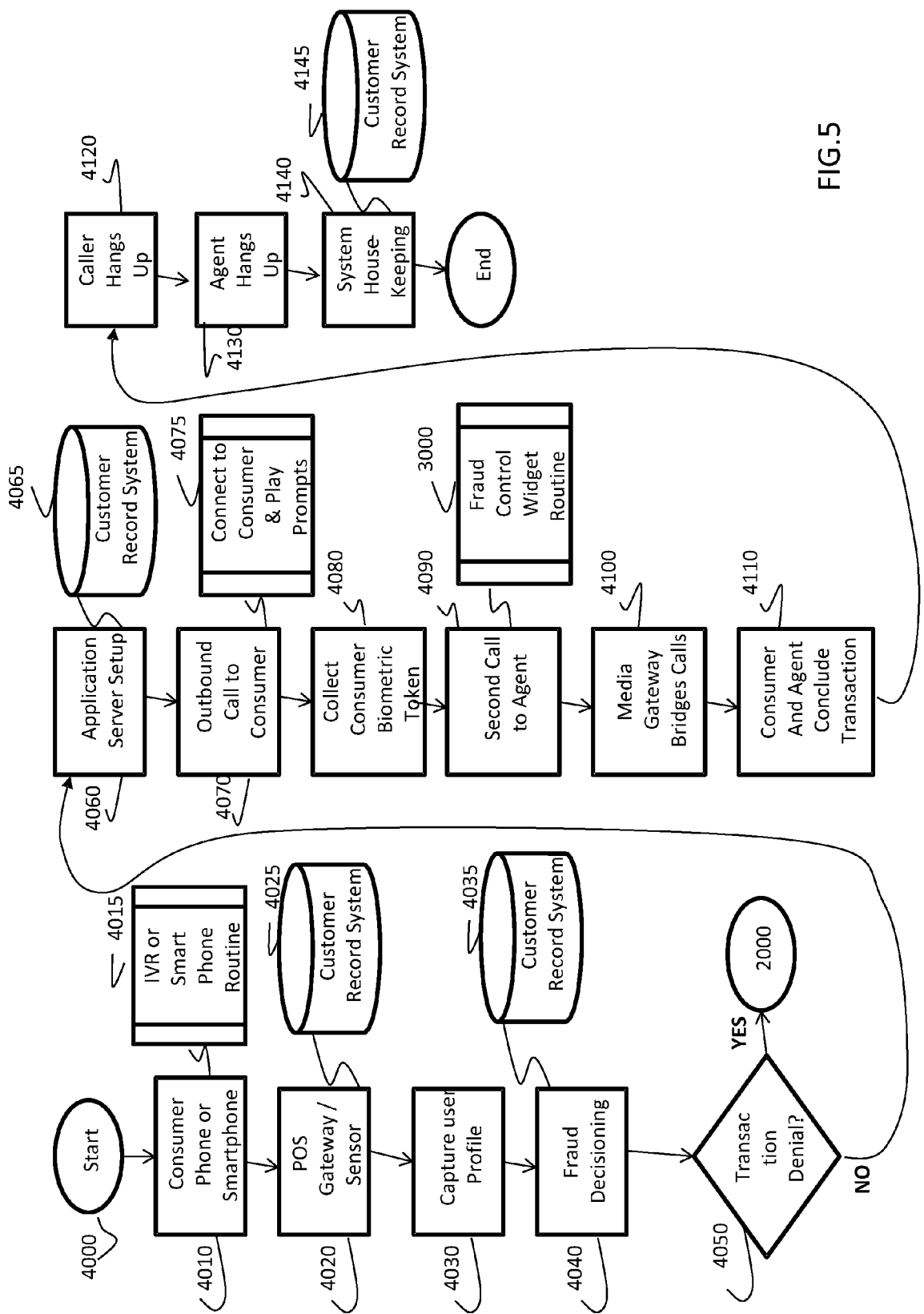
FIG. 5 is a flow diagram illustrating a transaction initiated with a phone or mobile communications device as handled by the financial transaction fraud prevention system.

FIG. 5 is a flowchart illustrating one exemplary sequence of interacting with the security application service 100, in which the transaction is initiated by a phone, smartphone, or other mobile communications device. The transaction process starts at step 4000, and at step 4010, the consumer initiates a financial transaction by calling in to the media gateway 101 on the communications device 202. In an alternate embodiment of the invention the communications device 202 can be replaced with a set top box and remote or an in-car telemetry system. At step 4015, the IVR or SmartPhone application routine is used to guide the consumer through logical steps—soliciting input from the consumer either in the form of spoken words, touch tone digits, or manipulations of the keys and/or soft keys of the communications device. Similarly, the manipulation of keys and/or soft keys or spoken words with a set top box and remote or an in-car telemetry system may be employed.

Also at step 4015, the routines for biometric enrollment, or for defining consumer preferences including limits, location and other attributes that can be solicited from the consumer, may be presented to the user. Such preferences and the methodology for soliciting the same are described in the U.S. patent application Ser. No. 12/767,544 filed Apr. 26, 2010 and entitled "Secure Customer Service Proxy Portal," the contents of which are expressly incorporated by reference herein.

At step 4020, credit card data, transaction request data and other consumer credentials are transmitted to the point of sale gateway and sensor 107. This is achieved by data communication means between the communications device 202 and the web commerce input 220, or alternately, by direct communication with the point of sale gateway and sensor 107. Then, at step 4025, a query is sent by the point of sale gateway and sensor 107 to the customer record system 108 in order to retrieve and match consumer data at step 1030.

The point of sale gateway and sensor 107 sends transactional data and consumer profile data to the fraud decisioning engine 106 at step 4040. The fraud decisioning engine 106 uses its stored algorithms, fraud profiling data, and stored templates and policies to make a decision on whether or not the transaction is suspected of being fraudulent. The fraud decisioning engine 106 will recommend a promotion of the transaction to the next step or a denial based on the aforementioned data in step 4050. If the fraud decisioning engine 106 suspects a fraudulent transaction, the transaction is initially denied which triggers step 2000. If the transaction is allowed to continue, the secure application server 104 initiates its biometric verification routine at step 4060.

At step 4065, the secure application server 104 queries the customer record system 108 for consumer data including pre-set consumer-imposed financial limits, and preferred alert thresholds. These are compared to other algorithms and alert thresholds set by the credit card or financial token provider, whereupon the fraud decisioning engine 106 will send commands to the secure application server 104. This triggers an outbound call to the consumer at step 1070 based on commands sent from the secure application server 104. In another aspect of the invention, this step 1070 may alternately employ a data channel between the secure application server 104 and the consumer communications device 202, where the status of the attempted financial transaction is displayed to the consumer on the communications device 202. This scenario is not limited to SmartPhones, and may also apply to a regular computer or tablet PC.

Next, in step 4075, the secure application server 104 commands the media gateway 101 to prompt the caller for credentials which may be entered via speech or touch tone. Likewise, the media gateway, in concert with the biometric engine 102, will analyze spoken input from the consumer to match and validate biometric information at step 4080. Alternatively, biometric capture can be performed at the communications device 202 and conveyed digitally to the media gateway 101 instead of over the telephone network. Depending on the way the system is deployed the consumer himself may be able to validate the financial transaction on his own and end the use of the system for that transaction.

Otherwise, the process continues with step 4090. Here, a call to a customer service agent is initiated form the media gateway 101. Now the fraud control widget routine commences as described in the steps beginning at step 3000 as described above. The media gateway 101 bridges the consumer telephone call and the agent telephone call together so they may speak in step 4100. The consumer and the agent conclude their dialog and resulting transaction at step 4110. The agent may initiate separate post-call routines depending on the workflow rules at that particular contact center. The consumer hangs up or otherwise terminates the session per step 4120, and likewise at step 4130, the agent also hangs up to end the transaction. At step 4140, all of the elements of the system perform standard housekeeping and clean-up tasks and the resulting data from the transaction are stored in the customer record system 108 at step 4145. Thus ends a typical transaction in the employ of the security application service 100 for a phone or SmartPhone-initiated transaction.

One advantage of the system is that it can be used during a transaction where approval or denial happens during the transaction itself. It is understood to reduce risk in online shopping cart transactions by confirming the identity of the customer prior to credit authorization. This is expected to reduce chargebacks due to fraud and reduces risk when shipping to third party addresses.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A financial transaction fraud prevention system comprising:
   a point of sale gateway connectible to a transaction source and receptive to transaction data including a transaction amount, a customer identifier and a financial account linked to a specific customer by the customer identifier;
   a customer record system for storing a plurality of customer profiles each indexed according to a specific customer identifier and defined by one or more transaction approval conditions;
   a fraud decisioning engine linked to the point of sale gateway, the fraud decisioning engine generating a first evaluation status based upon an comparison of the received transaction data and the one or more transaction approval conditions;
   a media gateway connectible to a first communication device associated with the customer in response to a transaction promotion recommendation from the fraud decisioning engine, biometric data captured following a response to a prompt generated by the media gateway being transferable from the communication device to the media gateway; and
   a biometric authentication engine linked to the fraud decisioning engine, in response to the first evaluation status, generating a second evaluation status based upon a comparison of the received biometric data to pre-stored biometric data;
   wherein completion of the transaction is suspended upon a failure of any one of the transaction approval conditions, the first evaluation status, and the second evaluation status.

2. The system of claim 1, further comprising:
   a secure application server connected to and managing the interactions between the point of sale gateway, the customer record system, the fraud decisioning engine, the media gateway, and the biometric authentication engine.

3. The system of claim 1, wherein the media gateway is connectible to a second communication device associated with a customer service agent, a communication link between the second communication device and the first communication device of the customer being established by the media gateway in response to the second transaction approval status.

4. The system of claim 3, further comprising:
   a fraud control application associated with the customer service agent, the fraud control application being receptive to the transaction data associated with the second transaction approval status.

5. The system of claim 1, wherein the transaction approval condition is a spending limit, the first transaction approval status being dependent on the transaction amount in relation to the spending limit.

6. The system of claim 1, wherein one of the transaction approval conditions is a use frequency limit, the transaction approval status being dependent on a total number of transactions within a predefined time period in relation to the use frequency limit.

7. The system of claim 1, wherein one of the transaction approval conditions is a use location limit, the transaction approval status being dependent on location identifiers associated with a current geographical position of the customer.

8. The system of claim 1, wherein one of the transaction approval conditions applies to a given single transaction.

9. The system of claim 1, wherein one of the transaction approval conditions applies to a cumulative set of multiple transactions.

10. The system of claim 1, wherein one of the transaction approval conditions is user-defined.

11. The system of claim 1, wherein the transaction approval condition is preset by an issuer of the financial account.

12. The system of claim 1, wherein:
    the received biometric data is representative of sound recorded in a first time instance corresponding to a preselected utterance; and
    the pre-stored biometric data is representative of sound recorded in a second time instance earlier than the first instance and corresponding to the preselected utterance.

13. The system of claim 1, wherein the transaction source is a web commerce input.

14. The system of claim 1, wherein the transaction source is a point of sale terminal input.

15. The system of claim 1, wherein the transaction source is an Automated Clearing House (ACH) input.

16. A method for validating a transaction, comprising:
    receiving transaction data including a transaction amount and a set of payment credentials associated with a customer as specified by a corresponding customer identifier;
    generating a first evaluation status from a comparison of the transaction data to one or more transaction approval conditions;
    transmitting from a media gateway a biometrics query to a first communications device associated with the customer based upon the first evaluation status, the biometrics query including a prompt to the customer to provide a response;

receiving the prompted response to the biometrics query from the first communications device;

generating a second evaluation status from a comparison of the response to the biometrics query and a pre-stored biometrics data;

wherein further processing of the transaction is stopped upon a failure of any one of the first evaluation status and the second evaluation status.

17. The method of claim 16, further comprising:

initiating a first communications link to a second communications device associated with a customer service agent based upon the second evaluation status;

initiating a second communications link to the first communications device; and bridging the first communications link and the second communications link.

18. The method of claim 17, further comprising:

transmitting the transaction data, the first evaluation status, and the second evaluation status to a customer service application associated with the customer service agent.

19. The method of claim 16, wherein:

the response to the biometrics query is representative of sound recorded in a first time instance corresponding to a preselected utterance; and the pre-stored biometric data is representative of sound recorded in a second time instance earlier than the first instance and corresponding to the preselected utterance.

20. The method of claim 16, further comprising:

swiping a magnetic strip card to retrieve the payment credentials from a physically presented payment token.

21. The method of claim 16, further comprising:

receiving entries of each of the payment credentials.

22. The method of claim 16, wherein one of the transaction approval conditions is a spending limit, the first transaction approval status being dependent on the transaction amount in relation to the spending limit.

23. The method of claim 16, wherein one of the transaction approval conditions is a use frequency limit, the transaction approval status being dependent on a total number of transactions within a predefined time period in relation to the use frequency limit.

24. The method of claim 16, wherein one of the transaction approval conditions is a use location limit, the transaction approval status being dependent on location identifiers associated with a current geographical position of the customer.

\* \* \* \* \*